US008811319B2

(12) United States Patent
Shen

(10) Patent No.: US 8,811,319 B2
(45) Date of Patent: Aug. 19, 2014

(54) TERMINAL ACCESS METHOD, SYSTEM AND ASSOCIATED DEVICES

(75) Inventor: Xiaodong Shen, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 171 days.

(21) Appl. No.: 13/393,142

(22) PCT Filed: Aug. 2, 2010

(86) PCT No.: PCT/CN2010/075627
§ 371 (c)(1),
(2), (4) Date: Mar. 16, 2012

(87) PCT Pub. No.: WO2011/023057
PCT Pub. Date: Mar. 3, 2011

(65) Prior Publication Data
US 2012/0188897 A1 Jul. 26, 2012

(30) Foreign Application Priority Data
Aug. 31, 2009 (CN) .......................... 2009 1 0091649

(51) Int. Cl.
*H04W 4/00* (2009.01)
*H04W 52/24* (2009.01)
*H04W 88/02* (2009.01)

(52) U.S. Cl.
USPC .......................................... 370/329; 370/341

(58) Field of Classification Search
None
See application file for complete search history.

(56) References Cited

U.S. PATENT DOCUMENTS

2009/0176525 A1* 7/2009 Wang et al. .................. 455/522
2010/0020771 A1* 1/2010 Ji et al. ......................... 370/336
2010/0041428 A1* 2/2010 Chen et al. ................... 455/522
2010/0272086 A1* 10/2010 Jung et al. .................... 370/338
2010/0309877 A1* 12/2010 Damnjanovic et al. ....... 370/331
(Continued)

FOREIGN PATENT DOCUMENTS

| CN | 1512802 | 7/2004 |
| CN | 101141156 | 3/2008 |

(Continued)

OTHER PUBLICATIONS

International Search Report mailed Nov. 11, 2010, for application No. PCT/CN2010/075627.

*Primary Examiner* — Chi Pham
*Assistant Examiner* — Soon-Dong D Hyun
(74) *Attorney, Agent, or Firm* — Workman Nydegger

(57) ABSTRACT

A terminal access method is disclosed. The method includes the following steps: the terminal receives an auxiliary synchronization signal sent by a base station on a transmission resource which is chosen from an uplink and used for transmitting downlink data; the terminal calculates transmission power according to the auxiliary synchronization signal; and the terminal sends a Random Access Channel (RACH) access preamble code to the base station according to the transmission power and performs a RACH access process. In this technical solution, the auxiliary synchronization signal is transmitted in a special sub-frame selected from the uplink, which makes it possible for the terminal to obtain the channel quality information of the uplink by receiving the auxiliary synchronization signal during a cell synchronization stage, and determine the transmission power according to the channel quality information of the uplink before the RACH process occurs, thereby reducing the step of adjusting the transmission power and shortening the time of the random access of the channel. A terminal access system and associated devices are also provided.

8 Claims, 6 Drawing Sheets

Fig. 5

(56) References Cited

U.S. PATENT DOCUMENTS

2011/0029596 A1* 2/2011 Spatscheck et al. .......... 709/203
2011/0164545 A1* 7/2011 Koo et al. .................... 370/312
2011/0294530 A1* 12/2011 Malladi et al. ................ 455/509

FOREIGN PATENT DOCUMENTS

| CN | 101400157 | 1/2009 |
| CN | 101420263 | 4/2009 |
| CN | 101835174 | 9/2010 |

* cited by examiner

TERMINAL ACCESS METHOD, SYSTEM AND ASSOCIATED DEVICES

CROSS REFERENCE TO RELATED APPLICATIONS

The present application is a US National Stage of International Application No. PCT/CN2010/075627, filed 2 Aug. 2010, designating the United States, and claiming priority to Chinese Patent Application No. 200910091649.8 filed 31 Aug. 2009. Both of the aforementioned applications are incorporated herein in their entirety.

FIELD

Embodiments of the present invention relate to the field of communications and particularly to a user equipment access method, system and related device.

BACKGROUND

In the prior art, a frame structure of Time Division-Long Term Evolution (LTE) includes the Frequency Division Duplex (FDD) Type1 and the Time Division Duplex (TDD) Type2.

In the frame structure of the FDD Type1 as illustrated in FIG. 1, a radio frame of 10 ms is divided into ten sub-frames with a length of 1 ms, each of which is consisted of two slots with a length of 0.5 ms.

In the frame structure of the TDD Type2 as illustrated in FIG. 2, a 10 ms radio frame is consisted of two half-frames with a length of 5 ms, each of which is consisted of five sub-frames with a length of 1 ms including four normal sub-frames and one special sub-frame. The normal sub-frames each are consisted of two 0.5 ms slots, and the special sub-frame is consisted of three special slots: an Uplink Pilot Time Slot (UpPTS), a Guard Period (GP) and a Downlink Pilot Time Slot (DwPTS). The LTE TDD Type2 is also referred to as TD-LTE.

In an existing synchronization solution of LTE, there are a "primary synchronization signal" and a "secondary synchronization signal" on a synchronization channel for cell searching. In the two frame structures, the LTE synchronization signals are located differently: the primary synchronization signal and the secondary synchronization signal adjoining together are located in the middle of the sub-frames 0 and 5 in the FDD Type1, as illustrated in FIG. 3; in the TDD Type2, the secondary synchronization signal is located at the end of the sub-frame 0 and the primary synchronization signal is located in the special sub-frame, i.e., the third symbol of the DwPTS, as illustrated in FIG. 4.

Thus in the two frame structures, the absolute locations of the synchronization signals in a radio frame are different, and more importantly the relative locations of the primary synchronization signal and the secondary synchronization signal are different: the primary synchronization signal and the secondary synchronization signal adjoin together in the FDD and are spaced by a temporal interval of two symbols in the TDD. Since the synchronization signals are the first signals to be detected by a user equipment searching for a cell, such a design with a varying relative location may enable the user equipment to detect an FDD or TDD duplex mode of a network at the very beginning of an access to the network.

The user equipment with an access to the network has to perform a corresponding synchronization process for time slot synchronization and symbol synchronization, particularly as follows:

The user equipment receives a primary synchronization signal from a base station and performs cell synchronization according to the primary synchronization signal and also locates a 5 ms temporal reference according to a primary synchronization code and adjusts a carrier frequency. The user equipment receives a secondary synchronization signal from the base station and detects a cell identifier according to the secondary synchronization signal, and the secondary synchronization signal is a different pilot sequence adopted for respective cells.

In a random access process, the user equipment detects reception power of a pilot sequence received in the downlink and then acquires a path loss of a downlink channel according to predefined transmission power and determines transmission power from the path loss and reception power required for the base station.

Since a carrier frequency in the uplink is different from that in the downlink in an FDD system, there is no reciprocity between the uplink and the downlink, and the user equipment can not estimate channel attenuation in the uplink from reception power of the received primary and secondary synchronization signals transmitted in the downlink, so that transmission power of the last Physical Random Access Channel (PRACH) preamble is controlled in a power ramping mode of PRACH power control in the prior art, that is, firstly transmission power is estimated taking downlink attenuation as uplink attenuation and a preamble is transmitted, and if there is no feedback for the last preamble, then the power is boosted for another transmission. A calculation formula of PRACH power control is:

$$P=\min\{P_{max}, PL+P_{0,pre}+\Delta_{pre}+(N_{pre}-1)dP_{rampup}\}$$

Where P is transmission power of the preamble of the user equipment; $P_{max}$ is the maximum transmission power of the user equipment; PL is the value of a downlink path loss measured by the user equipment; $P_{0,pre}$ is a cell specific parameter, i.e., target reception power of the preamble at the eNodeB (base station) dynamically ranging from −120 dBm to −90 dBm with a resolution of 2 dB; $\Delta_{pre}$ is a correction value for a varying preamble length; $N_{pre}$ is the number of times that the user equipment transmits the preamble; and $dP_{rampup}$ is a cell-specific power ramping step for retransmission of the preamble and takes possible values of 0, 2, 4 and 6 dB. The user equipment boosts the transmission power continuously by the step of $dP_{rampup}$ as the number of times that the user equipment transmits the preamble is increased, thereby achieving the effect of power ramping.

In the existing FDD system, the user equipment can not acquire accurately any uplink path loss to further determine the transmission power of the RACH access preamble and consequently has to trigger the power ramping flow to adjust the transmission power prior to the random channel access, thus complicating and prolonging the random link access process.

SUMMARY

Embodiments of the invention provide a user equipment access method, system and related device to simplify and shorten a random channel access process in an FDD system.

An embodiment of the invention provides a user equipment access method including the operations of:

a user equipment receiving a secondary synchronization signal transmitted from a base station on a transmission resource selected in the uplink for transmission of downlink data;

the user equipment calculating transmission power from the secondary synchronization signal; and the user equipment transmitting an RACH access preamble to the base station at the transmission power to perform an RACH access process.

Preferably the user equipment calculating transmission power from the secondary synchronization signal includes:

the user equipment detecting reception power of a pilot sequence of the received secondary synchronization signal and determining a path loss in the uplink from the detected reception power and transmission power preset by the base station; and the user equipment determining the transmission power as the sum of the path loss in the uplink and reception power required for the base station.

Preferably the base station transmitting the secondary synchronization signal on the transmission resource in the uplink for transmission of downlink data includes:

the base station selecting one of every five adjacent sub-frames in the uplink as a special sub-frame including in turn a downlink transmission time slot, a guard period and an uplink special time slot; and the base station transmitting the secondary synchronization signal to the user equipment in the downlink transmission time slot in the selected special sub-frame.

Preferably the base station transmitting the secondary synchronization signal in the downlink transmission time slot in the uplink includes:

the base station selecting for transmission of the secondary synchronization signal a time-frequency resource block including six resource blocks in the middle of the uplink frequency band in the frequency domain and at the third symbol location in the downlink transmission time slot in the time domain; and transmitting the secondary synchronization signal in the selected time-frequency resource block.

An embodiment of the invention provides a user equipment access system including at least one user equipment and at least one base station in a TD-LTE network, wherein:

the base station is configured to select a transmission resource in the uplink for transmission of downlink data and to transmit a secondary synchronization signal to the user equipment on the selected transmission resource; and the user equipment is configured to receive the secondary synchronization signal transmitted from the base station on the transmission resource selected in the uplink for transmission of downlink data, to calculate transmission power from the secondary synchronization signal, and to transmit an RACH access preamble to the base station at the transmission power to perform an RACH access process.

An embodiment of the invention provides a user equipment applicable to a TD-LTE system including the user equipment and a base station, the user equipment including:

a receiving module configured to receive a secondary synchronization signal transmitted from the base station on a transmission resource selected in the uplink for transmission of downlink data;

a power calculating module connected with the receiving module and configured to calculate transmission power from the secondary synchronization signal received by the receiving module; and an RACH accessing module connected with the power calculating module and configured to transmit an RACH access preamble to the base station at the transmission power calculated by the power calculating module to perform an RACH access process.

Preferably the power calculating module is configured to detect reception power of a pilot sequence of the secondary synchronization signal received by the receiving module, to acquire a path loss in the uplink according to the detected reception power and transmission power preset by the base station, and to determine the transmission power as the sum of the path loss in the uplink and reception power required for the base station.

An embodiment of the invention provides a base station applicable to a TD-LTE system including a user equipment and the base station, the base station including:

a selecting module configured to select a transmission resource in the uplink for transmission of downlink data; and a secondary synchronization signal transmitting module configured to transmit a secondary synchronization signal on the transmission resource selected by the selecting module.

Preferably the selecting module selects one of every five adjacent sub-frames in the uplink as a special sub-frame including a downlink transmission time slot, a guard period and an uplink special time slot in that order and takes the downlink transmission time slot in the selected special sub-frame as the transmission resource for transmission of downlink data.

Preferably the selecting module selects for transmission of the secondary synchronization signal a time-frequency resource block including six resource blocks in the middle of the uplink frequency band in the frequency domain and at the third symbol location in the downlink transmission time slot in the time domain.

The embodiments of the invention have the following advantages over the prior art:

In the embodiments of the invention, the secondary synchronization signal is transmitted in the special sub-frame in the uplink so that the user equipment can acquire uplink channel quality information upon reception of the secondary synchronization signal during cell synchronization and can determine transmission power according to the uplink channel quality information prior to an RACH process to thereby reduce the number of operations for adjusting the transmission power and shorten a random channel access.

DETAILED DESCRIPTION

The technical solutions according to the embodiments of the invention will be described clearly and fully below with reference to the drawings in the embodiments of the invention, and apparently the described embodiments are only a part but not all of embodiments of the invention. Any other embodiments which can occur to those ordinarily skilled in the art benefiting from the described embodiments of the invention and without any inventive effort shall come into the claimed scope of the embodiments of the invention.

In the transmission solution of the existing FDD system, only downlink data, i.e., only data transmitted from the network side to the user equipment, is transmitted in respective time slots of respective sub-frames in the downlink; and correspondingly, only uplink data, i.e., only data transmitted from the user equipment to the network side, is transmitted in respective time slots of respective sub-frames in the uplink.

A basic idea of the embodiments of the invention lies in that firstly the transmission solution of the existing FDD system is adapted so that a part of a transmission resource is selected in the uplink for transmission of downlink data, and particularly a base station selects a part of the resource (a part of sub-frames or a part of time slots of a sub-frame) in the uplink for transmission of downlink data and further selects a part of time slots in the part of the resource for transmission of a secondary synchronization signal.

Correspondingly the user equipment receives the secondary synchronization signal in the part of the time slots and determines a path loss in the uplink according to the received secondary synchronization signal and further calculates transmission power of the user equipment to thereby avoid the situation in which the user equipment can not acquire the path loss in the uplink and has to trigger the power ramping flow for a number of times to determine reasonable transmission power.

The implementation principle and specific implementations of the technical solutions of the invention and advantageous effects they can attain correspondingly will be set forth in details below with reference to the respective drawings.

Figure 5:
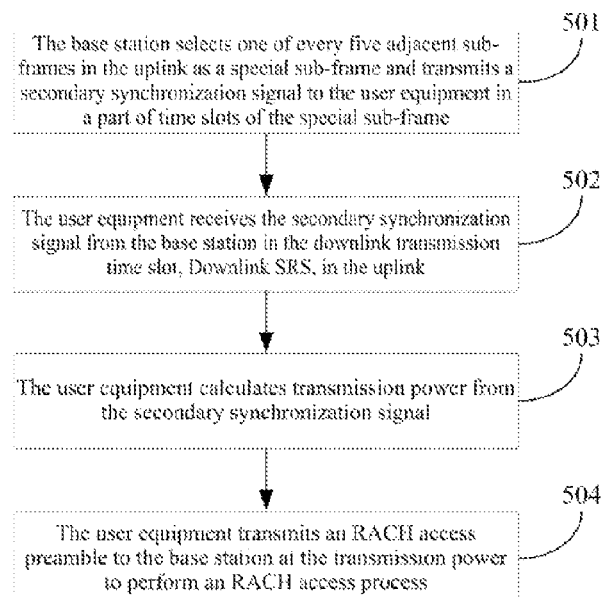
FIG. 5 is a flow chart of a user equipment access method according to an embodiment of the invention.

An embodiment of the invention provides a user equipment access method applicable to an LTE system including a user equipment and a base station, and as illustrated in FIG. 5, the method includes the following operations 501 to 504.

In the operation 501, the base station selects one of every five adjacent sub-frames in the uplink as a special sub-frame and transmits a secondary synchronization signal to the user equipment in a part of time slots of the special sub-frame.

Figure 6:
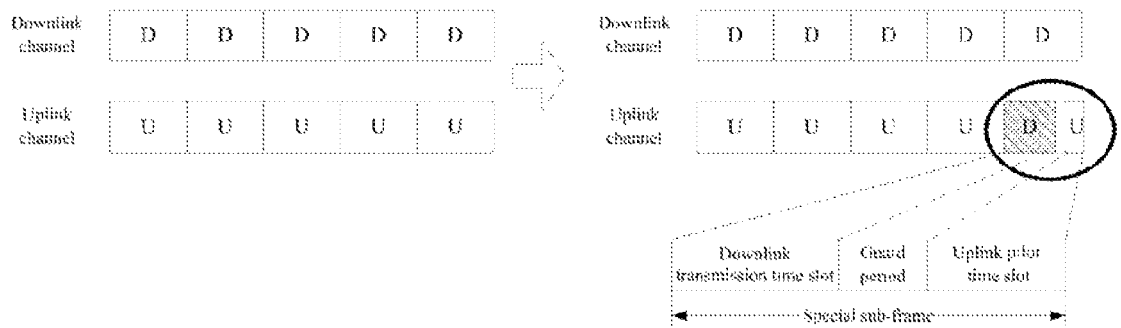
FIG. 6 is a schematic diagram of a special sub-frame selected in the uplink according to an embodiment of the invention.

Particularly the special sub-frame includes a downlink transmission time slot, Downlink SRS, an UpPTS and a GP as illustrated in FIG. 6. Since every five adjacent sub-frames in the uplink have the same structure, a description will be given of only five adjacent sub-frames as example for the sake of brevity. Particularly there are a schematic diagram of the existing FDD uplink and downlink to the left of the arrow and a schematic diagram of the adapted FDD uplink and downlink to the right of the arrow, and the base station takes the last sub-frame (the invention will not be limited to the last sub-frame but any sub-frame at any location among the five sub-frames is possible) as a special sub-frame and transmits a secondary synchronization signal in the Downlink SRS of the special sub-frame. Particularly the Guard Period (GP) is for the purpose of lowering interference between a downlink signal transmitted in the Downlink SRS and another normal uplink sub-frame.

Particularly reference is made to the 3GPP TS36.211 Section 6.11.2.1 for the definition and format of a secondary synchronization sequence and to the 3GPP TS36.211 Section 6.11.2.2 for resource mapping of a secondary synchronization signal.

Figure 7A:
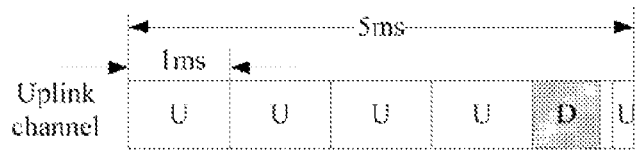
FIG. 7a is a schematic diagram of the uplink adapted according to an embodiment of the invention.
Figure 7B:
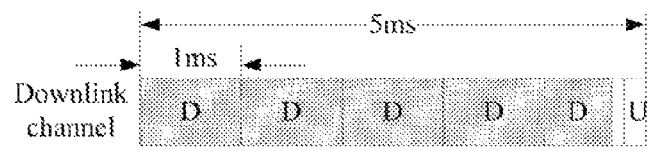
FIG. 7b is a schematic diagram of the downlink adapted according to an embodiment of the invention.

In the adapted FDD transmission solution, there is an approximately allocation ratio 4:1 of a transmission resource for transmission of uplink data to a transmission resource for transmission of downlink data among every five adjacent sub-frames in the uplink as illustrated in FIG. 7a, and preferably a part of a transmission resource can be selected correspondingly in the downlink for transmission of uplink data; and there is an approximately allocation ratio 5:0 of a transmission resource for transmission of downlink data to a transmission resource for transmission of uplink data among every five adjacent sub-frames in the downlink as illustrated in FIG. 7b.

In the operation 502, the user equipment acquires from cell broadcast or otherwise the time-frequency location of the uplink transmission resource (the downlink transmission time slot, Downlink SRS, in the present embodiment) in which the base station transmits the secondary synchronization signal and then receives the secondary synchronization signal from the base station at the time-frequency location (particularly in the downlink transmission time slot, Downlink SRS, in the uplink in the present embodiment), adds the secondary synchronization signal into the special sub-frame in the FDD uplink and acquires transmission power according to the secondary synchronization signal prior to an RACH access process. Also the secondary synchronization signal is transmitted in the FDD downlink in order to dispense with any significant modification to the existing devices, or the base station can be modified to transmit no secondary synchronization signal in the FDD downlink in order to conserve a resource.

In the operation 503, the user equipment calculates transmission power from the secondary synchronization signal, and particularly the user equipment detects reception power ($P_{PSS\_RX}$, dB) of a pilot sequence of the secondary synchronization signal received in the downlink transmission time slot, Downlink SRS, in the uplink and further acquires a path loss in the downlink ($PL_{DL}$, dB) according to transmission power ($P_{PSS\_TX}$, dB) preset by the base station:

$$PL_{DL}=P_{PSS\_TX}-P_{PSS\_RX}$$

Since uplink data is transmitted in a part of a transmission resource (i.e., the transmission resource other than the downlink transmission time slot, Downlink SRS) in the adapted uplink and also a secondary synchronization signal is transmitted in a part of the transmission resource (i.e., the downlink transmission time slot, Downlink SRS), a path loss on an uplink transmission resource can be determined by reciprocity from the path loss on the downlink transmission resource acquired by the user equipment. The path loss in the uplink ($PL_{UL}$, dB) is as follows:

$$PL_{UL}=PL_{DL};$$

Hereupon the user equipment determines transmission power ($P_{RACH\_TX}$, dB) according to the path loss in the uplink $PL_{UL}$ and reception power required for the base station ($P_{RACH\_Required\_RX}$, dB).

$$P_{RACH\_TX}=P_{RACH\_Required\_RX}+PL_{UL}+L_{offset}$$

Where $L_{offset}$ is a variation of the link loss in the uplink and the downlink due to a hardware device or another reason and is a constant value changing slowly with a factor of ambient temperature, humidity, etc. $L_{offset}$ can be preconfigured at the network side or the side of the user equipment.

The transmission power ($P_{PSS\_TX}$, dB) preset by the base station can be transmitted together with the secondary synchronization signal to the user equipment or acquired otherwise by the user equipment, for example, the transmission power preset by the base station can be pre-stored at the user equipment:

In the operation 504, the user equipment transmits an RACH access preamble to the base station at the transmission power to perform an RACH access process.

Figure 8A:
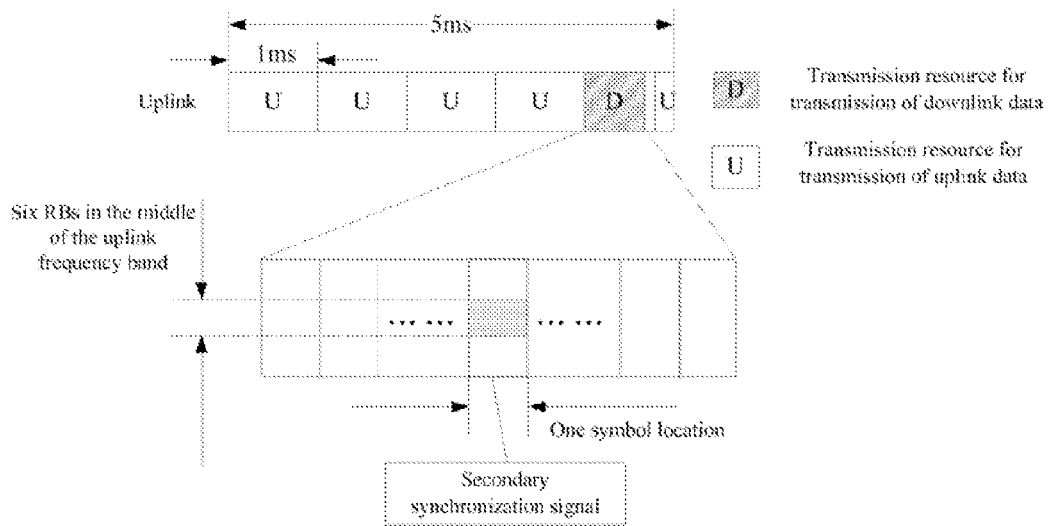
FIG. 8a is a schematic diagram of transmitting a secondary synchronization signal in a time-frequency resource block of any symbol in a downlink transmission time slot of an uplink special sub-frame according to an embodiment of the invention.

Preferably in the operation 501, the base station transmits the secondary synchronization signal in the downlink transmission time slot, Downlink SRS, of the special sub-frame selected from every five adjacent sub-frames in the uplink particularly as follows:

The base station selects for transmission of the secondary synchronization signal a time-frequency resource block including six RBs (Resource Blocks) in the middle of the uplink frequency band in the frequency domain and at any symbol in the downlink transmission time slot of the special sub-frame in the time domain. As illustrated in FIG. 8a, other REs (Resource Elements) in the uplink frequency band than the six RBs in the middle are removed at the location of the symbol in the frequency domain.

Figure 1:
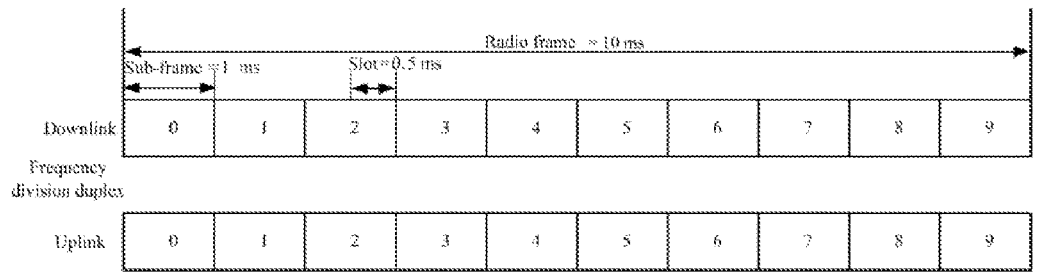
FIG. 1 is a diagram of the frame structure of the FDD Type1 in the prior art.
Figure 2:
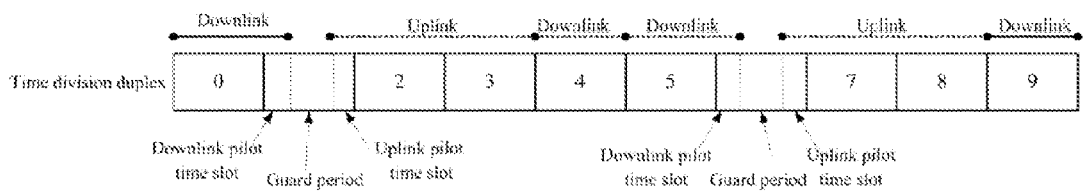
FIG. 2 is a diagram of the frame structure of the TDD Type2 in the prior art.
Figure 3:
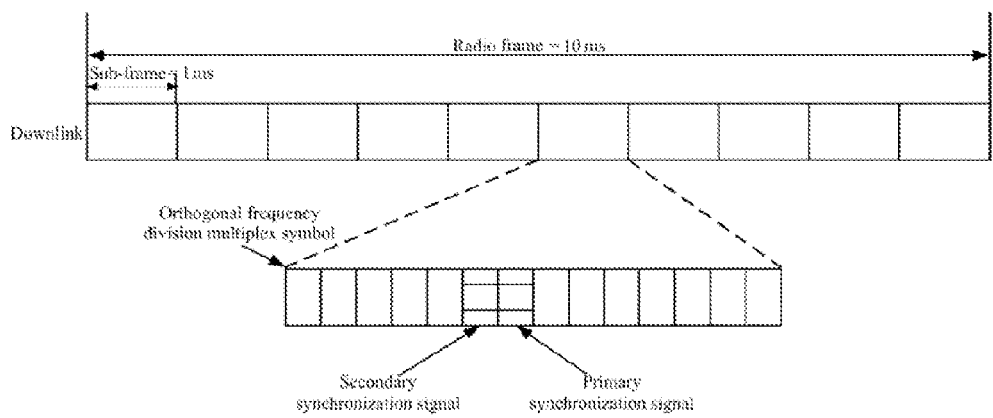
FIG. 3 is a schematic diagram of the locations of the primary and secondary synchronization signals of the FDD Type1 in the prior art.
Figure 4:
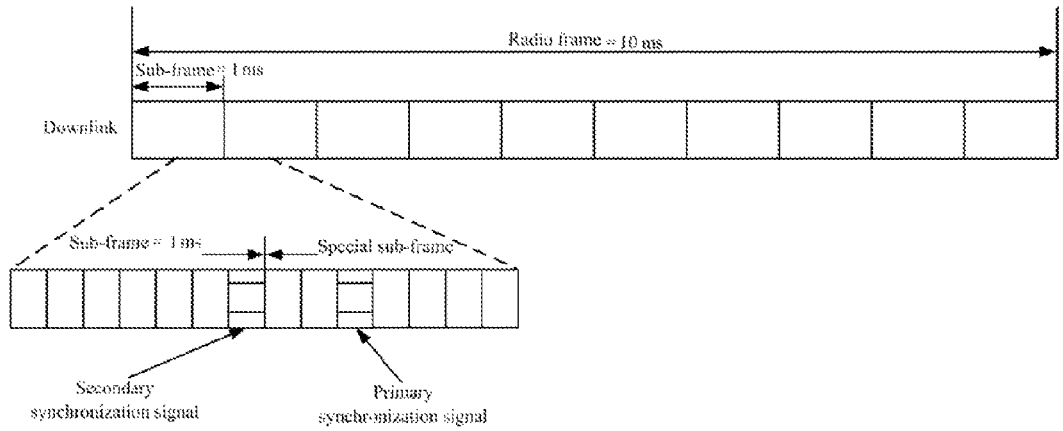
FIG. 4 is a schematic diagram of the locations of the primary and secondary synchronization signals of the TDD Type2 in the prior art.
Figure 8B:
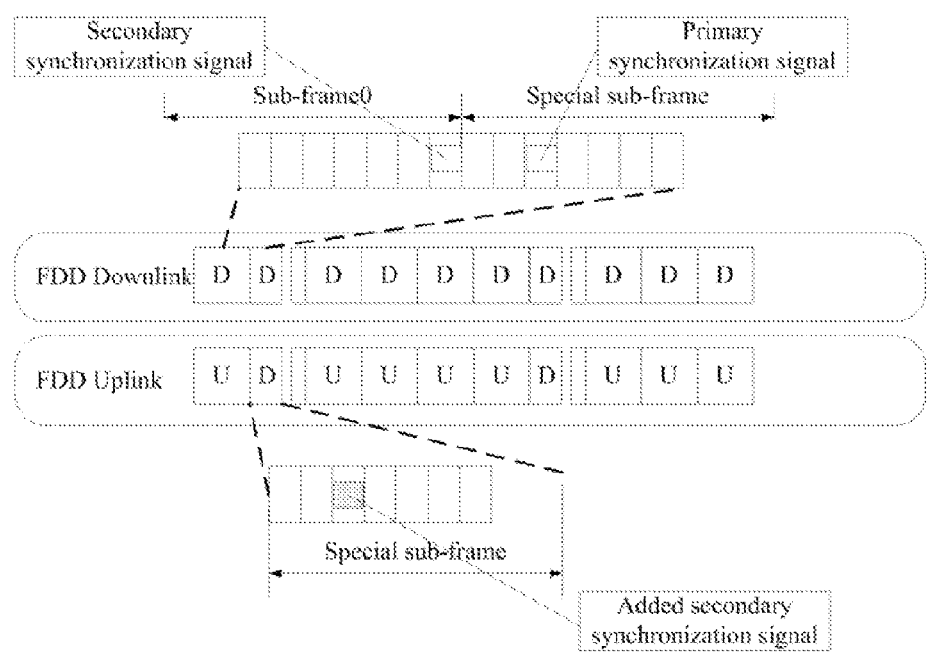
FIG. 8b is a schematic diagram of transmitting a secondary synchronization signal in time-frequency resource blocks at corresponding locations in the uplink and the downlink according to an embodiment of the invention.

Preferably at most ten symbol locations are allocated in the special sub-frame as the downlink transmission time slot (Downlink SRS) in which downlink data is transmitted because there are typically 14 symbol locations in a sub-frame. The remaining four symbols are used for the UpPTS and the GP. In order to correspond to the location of the time-frequency resource block in which the primary synchronization signal is transmitted in the downlink of the existing TDD system as illustrated in FIG. 4, 6 RBs in the middle at the third symbol location in the downlink transmission time slot, Downlink SRS, of the special sub-frame in the uplink can be selected for transmission of the secondary synchronization signal as illustrated in FIG. 8b.

Figure 9:
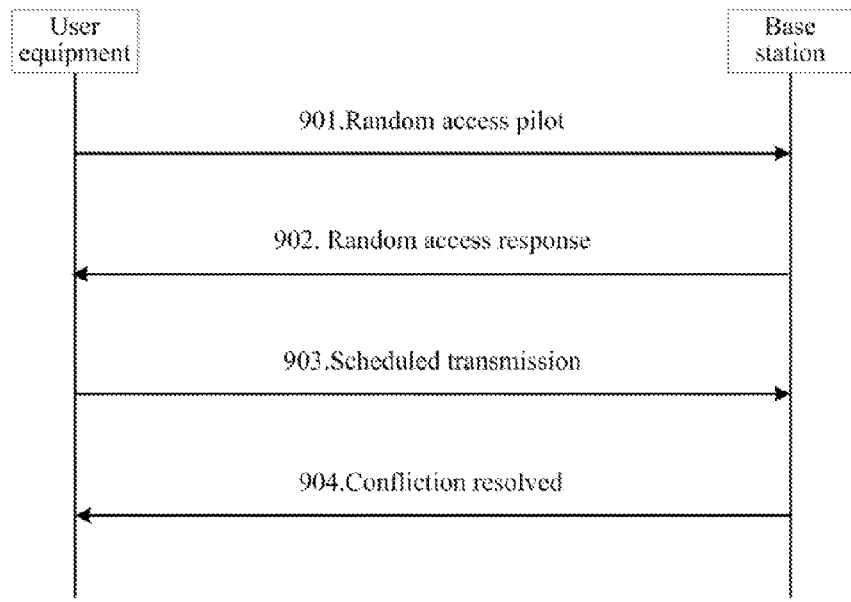
FIG. 9 is a flow chart of an RACH access process according to an embodiment of the invention.

As illustrated in FIG. 9, an RACH (Random Access Channel) process includes the following operations 901 to 904.

In the operation 901, the user equipment transmits an RACH access preamble to the base station on an uplink PRACH channel at the transmission power acquired from the secondary synchronization signal by occupying an uplink carrier. Since uplink synchronization has not been attained at this time, preamble information can only be passed implicitly in a set of signature sequences. For example, 4 to 6-bit information can be carried in 16 to 64 sequences. The information is used to bear, for example, a random ID, an access purpose, a CQI (Channel Quality Indication), information on a downlink carrier path loss, whether to request for a C-RNTI (Cell-Radio Network Temporary Identifier), etc., In the operation 902, the base station transmits to the user equipment an RACH access response carrying a sequence ID, a TA (Timing Advance), a resource allocation, etc.

In the operation 903, the user equipment transmits an L2/L3 message to the base station.

In the operation 904, the base station feeds a contest resolution message back to the user equipment.

Figure 10:
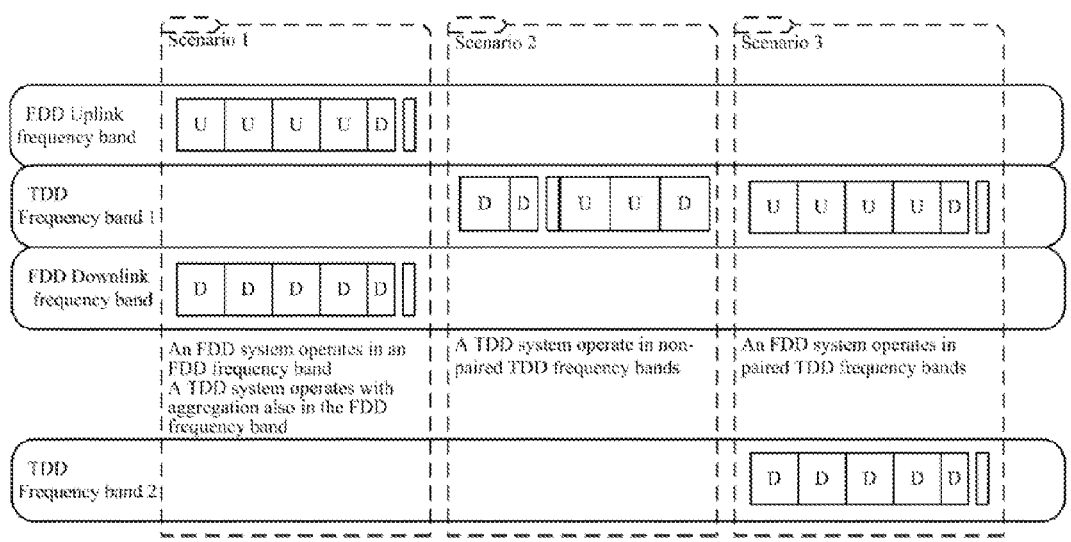
FIG. 10 is a principle diagram of uplink and downlink transmission solutions adapted according to an embodiment of the invention.

Referring to FIG. 10, the solution in which a transmission resource is selected in the FDD uplink for transmission of downlink data as introduced above and the solution in which a transmission resource is selected in the downlink for transmission of uplink data are combined in pair for use, and this is equivalent to possible transmission of uplink data and downlink data in the uplink and transmission of downlink data and uplink data in the downlink, so that the TDD system can operate on an FDD carrier.

An embodiment of the invention provides a user equipment access system including at least one user equipment and at least one base station in a TD-LTE network, where:

The base station is configured to select a transmission resource in the uplink for transmission of downlink data and to transmit a secondary synchronization signal to the user equipment on the selected transmission resource;

The user equipment is configured to receive the secondary synchronization signal transmitted from the base station on the transmission resource selected in the uplink for transmission of downlink data, to calculate transmission power from the secondary synchronization signal, and to transmit an RACH access preamble to the base station at the transmission power to perform an RACH access process.

Figure 11:
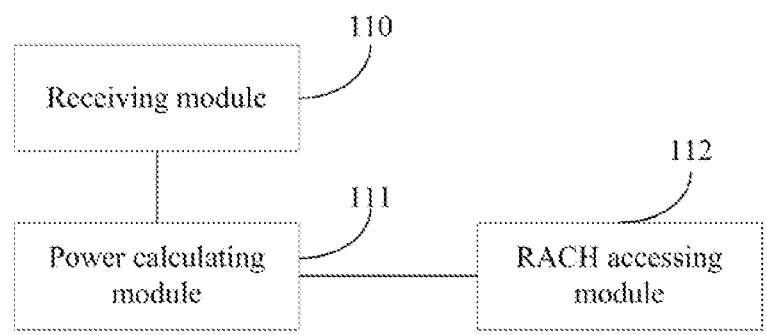
FIG. 11 is a schematic structural diagram of a user equipment according to an embodiment of the invention.

An embodiment of the invention provides a user equipment applicable to a TD-LTE system including the user equipment and a base station, and as illustrated in FIG. 11, the user equipment includes:

a receiving module 110 configured to receive a secondary synchronization signal transmitted from the base station on a transmission resource selected in the uplink for transmission of downlink data.

where the secondary synchronization signal is transmitted in a special sub-frame in the FDD uplink, and the user equipment determines transmission power according to the secondary synchronization signal prior to an RACH access process; also the secondary synchronization signal is transmitted in the FDD downlink in order to dispense with any significant modification to the existing devices, or the base station can be modified to transmit no secondary synchronization signal in the FDD downlink in order to conserve a resource;

a power calculating module 111 connected with the receiving module 110 and configured to calculate transmission power from the secondary synchronization signal received by the receiving module 110, and particularly the user equipment detects reception power of a pilot sequence received by the receiving module 110 and further acquires a path loss in the uplink according to transmission power preset by the base station, and the user equipment determines the transmission power as the sum of the path loss in the uplink and reception power required for the base station; particularly the transmission power preset by the base station can be transmitted together with the secondary synchronization signal to the user equipment or acquired otherwise by the user equipment, for example, a preset value of the transmission power of the base station can be pre-stored at the user equipment; and an RACH accessing module 112 connected with the power calculating module 111 and configured to transmit an RACH access preamble to the base station at the transmission power calculated by the power calculating module 111 to perform an RACH access process.

Figure 12:
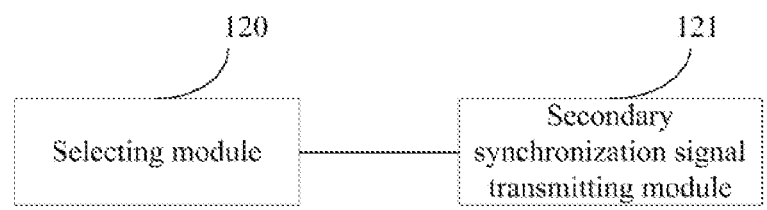
FIG. 12 is a schematic structural diagram of a base station according to an embodiment of the invention.

An embodiment of the invention provides a base station applicable to a TD-LTE system including a user equipment and the base station, and as illustrated in FIG. 12, the base station includes:

a selecting module 120 configured to select a transmission resource in the uplink for transmission of downlink data; a description will be given in the present embodiment in which a secondary synchronization signal is added into a special sub-frame in the FDD uplink by way of an example, and the secondary synchronization signal can alternatively be added into another time slot in the FDD uplink in a practical application; and a secondary synchronization signal transmitting module 121 connected with the selecting module 120 and configured to transmit a secondary synchronization signal on the transmission resource selected by the selecting module 120.

Preferably the selecting module 120 selects a time-frequency resource block including six RBs in the middle of the uplink frequency band in the frequency domain and at the third symbol location in the downlink transmission time slot in the time domain, for transmission of the secondary synchronization signal.

Preferably while transmitting the secondary synchronization signal on the time-frequency resource block selected by the selecting module including the six RBs in the middle of the uplink frequency band in the frequency domain and at the third symbol location in the downlink transmission time slot in the time domain, the secondary synchronization signal transmitting module 121 is further configured to remove other resource elements in the uplink frequency band than the 6 RBs in the middle and at the third symbol location in the downlink transmission time slot.

In the embodiments of the invention, the secondary synchronization signal is transmitted in the uplink special time slot so that the user equipment can acquire uplink quality information upon reception of the secondary synchronization signal during cell synchronization and can determine transmission power according to the uplink quality information prior to an RACH process to thereby reduce the number of operations for adjusting the transmission power.

Those skilled in the art can clearly appreciate from the foregoing description of the embodiments that the embodiments of the invention can be implemented in hardware or in software plus a necessary general hardware platform. Based upon such understanding, the technical solutions of the embodiments of the invention can be embodied in the form of a program product which can be stored in a nonvolatile storage medium (e.g., a CD-ROM, a U disk, a mobile hard disk, etc.) and which includes several instructions to cause a computer device (e.g., a personal computer, a server, a network device, etc.) to perform the solutions according to the respective embodiments of the invention.

Those skilled in the art can appreciate that the drawings are merely a schematic diagram of preferred embodiments, and the module(s) or the flow(s) may not necessarily be required to implement the embodiments of the invention.

Those skilled in the art can appreciate that the modules in the devices of the embodiments can be distributed in the devices of the embodiments as described in the embodiments or located in one or more devices different from those of the embodiments given corresponding variations. The modules of the embodiments can be combined into one module or further subdivided into a plurality of sub-modules.

The embodiments of the invention have been numbered only for the sake of a convenient description but will not represent any superiority of one embodiment to another.

The foregoing disclosure is merely illustrative of several embodiments of the invention, but the embodiments of the invention will not be limited thereto, and any variations that can occur to those skilled in the art shall come into the claimed scope of the embodiments of the invention.

The invention claimed is:

1. A user equipment access method, comprising:
a user equipment receiving a secondary synchronization signal transmitted from a base station on a transmission resource selected in the uplink for transmission of downlink data;
the user equipment calculating transmission power from the secondary synchronization signal; and
the user equipment transmitting a Random Access Channel (RACH) access preamble to the base station at the transmission power to perform an RACH access process,
wherein one of every five adjacent sub-frames in the uplink is selected by the base station as a special sub-frame comprising in turn a downlink transmission time slot, a guard period and an uplink special time slot, and the downlink transmission time slot in the selected special sub-frame are taken as the transmission resource for transmission of downlink data.

2. The method of claim 1, wherein the user equipment calculating transmission power from the secondary synchronization signal comprises:
the user equipment detecting reception power of a pilot sequence of the received secondary synchronization signal;
determining a path loss in the uplink according to the detected reception power and transmission power preset by the base station; and
the user equipment determining the transmission power as the sum of the path loss in the uplink and reception power required for the base station.

3. The method of claim 1, wherein the base station transmitting the secondary synchronization signal in the downlink transmission time slot in the uplink comprises:
the base station selecting for transmission of the secondary synchronization signal a time-frequency resource block comprising six resource blocks in the middle of the uplink frequency band in the frequency domain and at the third symbol location in the downlink transmission time slot in the time domain; and
transmitting the secondary synchronization signal on the selected time-frequency resource block.

4. The method of claim 1, wherein the user equipment is a user equipment applicable to a Time Division-Long Term Evolution, TD-LTE, system, and the base station is a base station applicable to the TD-LTE system.

5. A user equipment applicable to a Time Division-Long Term Evolution, TD-LTE, system comprising the user equipment and a base station, the user equipment comprising:
a receiving module configured to receive a secondary synchronization signal transmitted from the base station on a transmission resource selected in the uplink for transmission of downlink data;
a power calculating module connected with the receiving module and configured to calculate transmission power from the secondary synchronization signal received by the receiving module; and
a Random Access Channel (RACH) accessing module connected with the power calculating module and configured to transmit an RACH access preamble to the base station at the transmission power calculated by the power calculating module to perform an RACH access process, wherein one of every five adjacent sub-frames in the uplink is selected by the base station as a special sub-frame comprising in turn a downlink transmission time slot, a guard period and an uplink special time slot, and the downlink transmission time slot in the selected special sub-frame are taken as the transmission resource for transmission of downlink data.

6. The user equipment of claim 5, wherein:

the power calculating module is configured to detect reception power of a pilot sequence of the secondary synchronization signal received by the receiving module, to acquire a path loss in the uplink according to the detected reception power and transmission power preset by the base station, and to determine the transmission power as the sum of the path loss in the uplink and reception power required for the base station.

7. A base station applicable to a Time Division-Long Term Evolution, TD-LTE, system comprising a user equipment and the base station, the base station comprising:

a selecting module configured to select a transmission resource in the uplink for transmission of downlink data; and a secondary synchronization signal transmitting module configured to transmit a secondary synchronization signal on the transmission resource selected by the selecting module, wherein the selecting module selects one of every five adjacent sub-frames in the uplink as a special sub-frame comprising in turn a downlink transmission time slot, a guard period and an uplink special time slot, and takes the downlink transmission time slot in the selected special sub-frame as the transmission resource for transmission of downlink data.

8. The base station of claim 7, wherein the selecting module selects for transmission of the secondary synchronization signal a time-frequency resource block comprising six resource blocks in the middle of the uplink frequency band in the frequency domain and at the third symbol location in the downlink transmission time slot in the time domain.

* * * * *